UNITED STATES PATENT OFFICE.

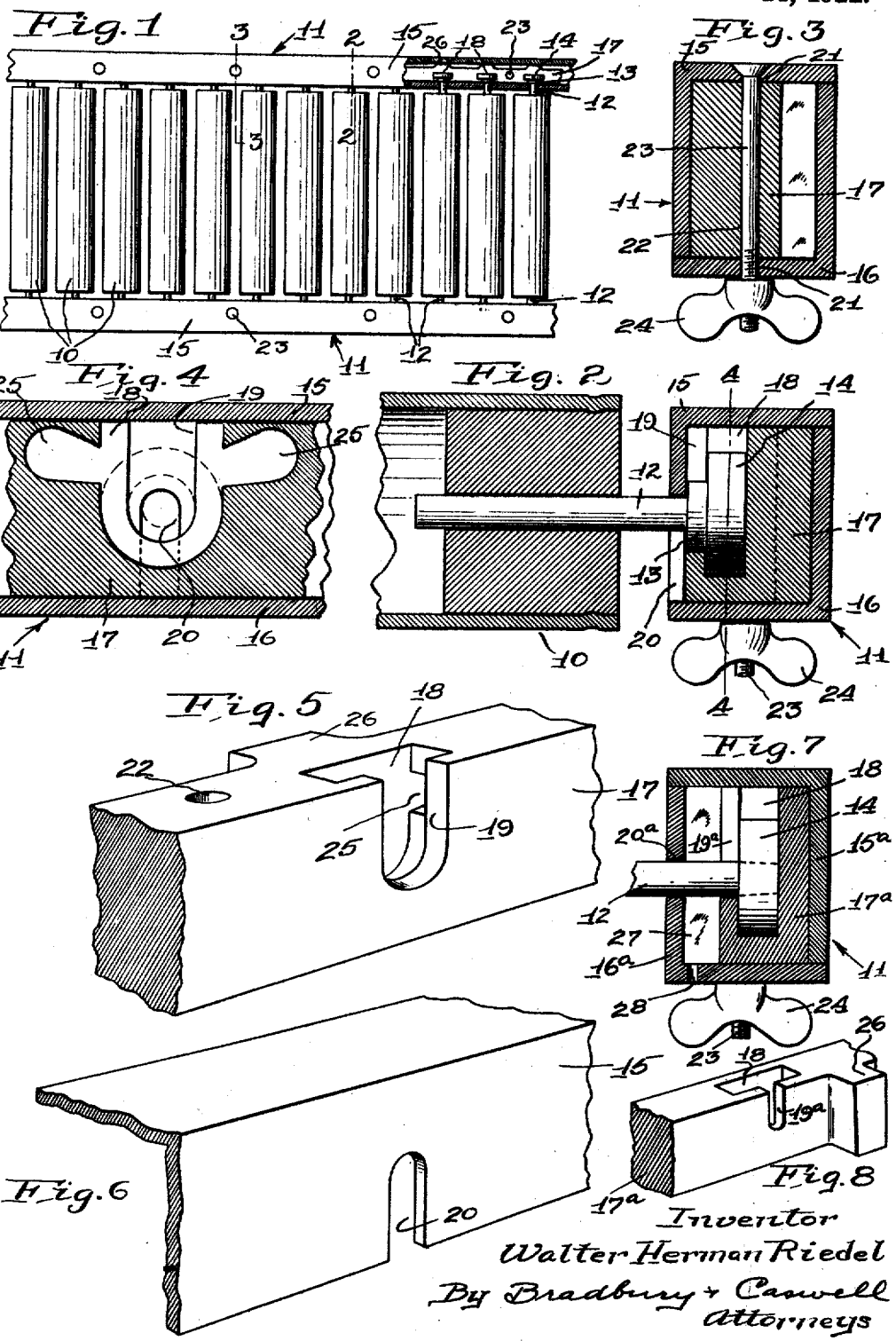

WALTER HERMAN RIEDEL, OF ST. PAUL, MINNESOTA.

GRAVITY CARRIER.

1,406,228.    Specification of Letters Patent.    Patented Feb. 14, 1922.

Application filed November 26, 1920. Serial No. 426,381.

*To all whom it may concern:*

Be it known that I, WALTER HERMAN RIEDEL, a citizen of the United States, residing at St. Paul, in the county of Ramsey and State of Minnesota, have invented a new and useful Gravity Carrier, of which the following is a specification.

My invention relates to improvements in gravity carriers.

Its object is to provide a simple, durable and inexpensive device of this nature having interchangeable parts adapted to be shipped or stored in promiscuous knocked-down form and quickly and easily assembled for use.

A further object is to provide a series of revoluble carrying elements and supporting rails therefor, the bearings for said revoluble elements being arranged within the rails and said rails comprising separable sections adapted, when assembled, to form rigid unitary structures.

Another object is to supply a supporting rail for the bearings of a series of rollers, or the like, said rail including a pair of angle irons and a journal carrying filler-bar encased thereby, said angle irons and filler-bar co-operating to form a rigid supporting structure.

A further object is to provide a device, as above, having in said filler-bar, means for receiving and trapping the lubricating medium for the roller bearings.

With the foregoing and other objects in view, which will appear in the following description, the invention resides in the novel combination and arrangement of parts and in the details of construction hereinafter described and claimed.

In the drawings, Fig. 1 is a plan view of a section of a device embodying my invention, portions thereof being broken away to disclose otherwise concealed parts; Fig. 2 is an enlarged sectional view taken on the line 2—2 of Fig. 1; Fig. 3 is an enlarged sectional view taken on the line 3—3 of Fig. 1; Fig. 4 is a detail sectional view taken on the line 4—4 of Fig. 2; Fig. 5 is an enlarged perspective view in detail illustrating a portion of one of the side rail members; Fig. 6 is a similar view illustrating a portion of a companion rail member and Figs. 7 and 8 are views similar to Figs. 2 and 5, respectively, and illustrate alternate forms of rail members.

Referring to the drawings, I have used the reference numeral 10 to designate a series of rollers and the numeral 11 to indicate supporting rails therefor (Fig. 1). The rollers 10, of suitable form, are supplied with axles 12 at the extremities thereof. Collars 13 are shrunk or otherwise fixed to said axles near the ends thereof. At the extremity of each axle, outside of said collars, I place a bearing 14 of ordinary design, including an inner race, an outer race and the usual rolling members therebetween. The inner race of each bearing 14 is shrunk or otherwise fitted to its respective axle 12. The rails 11 are identical, each including a bearing supporting section and a guard section to cover said bearings, both of said sections co-operating to form a rigid rail. In one form of rail, I employ a pair of angle irons 15 and 16, placed edge to edge in reverse relation, together with a filler-bar 17 designed to fit snugly within the tubular structure formed by said angle irons. The filler-bar 17 is formed with depressions or seats 18 designed to receive the bearings 14 on the axles 12 of the rollers 10. Slots 19, on the inner sides of the filler-bar, registering with said seats, receive the collars 13 on said axles 12. The angle iron 15 embraces the upper and inner sides of the filler-bar 17, while the companion angle iron 16 embraces the opposite sides of said filler-bar. Slots 20, in the lower margin of the upright flange of the angle iron 15, receive the axles 12 when said angle iron is applied to the filler-bar. Apertures 21, in the horizontal flanges of the angle irons 15 and 16, register with bores 22 in the filler-bar 17 and receive tie bolts 23, which are supplied with thumb nuts 24 adapted to clamp said members together. Prior to the application of the angle iron 15, a suitable lubricating medium may be placed within the bearing seats 18 of the filler-bar 17 and thus supply a lubricating bath for the bearings 14.

It is often necessary that conveyor sections of this type be tilted, such use being required in structures forming gates or switches. I have provided for retaining the lubricating medium in the seats 18 in the filler-bars 17, should the rails 11 be tilted in such practice. Traps 25, formed in the filler-bars 17 upon opposite sides of each bearing seat 18, catch and retain the oil therefrom, which might otherwise spill from said seats when the conveyor structure is swung into sharply inclined position.

The rails 11 may be carried by suitable standards, in accordance with the usual practice. It will be noted that the rail sections and rollers are identical and, therefore, readily interchangeable.

In my alternate structure (Figs. 7 and 8), the angle irons 15ª and 16ª are arranged so that the former embraces the upper and outer sides of the filler-bars 17ª and the latter embraces the inner and lower sides of said filler-bars. The upright flanges of the angle irons 16ª are formed with apertures 20ª to receive the axles 12 instead of slots 20 as in the form first described. The spacing lugs 26 are placed on the inner sides of the filler-bars 17ª and between the bearing seats 18 to form chambers 27. Water, or other matter penetrating the rail housing, is caught in these chambers and drained or discharged therefrom through openings 28 in the lower flanges of the angle irons 16ª. The collars 13 are omitted from the shafts 12 and the slots 19ª closely receive said shafts, the ends of which are tapered and merely fitted into tapered bores in the inner races of the bearings 14.

The simplicity of manufacture, ease in assembling and strength of structure are advantageous features of my invention; also the lubricating feature, the protected bearings and the oil retaining traps.

In use, the bearing seats 18 may be replenished with oil by simply removing the guard sections (angle irons 15, 15ª) of the rails 11, thus exposing the oil retaining seats 18. Re-application of said guard sections again covers the bearings 14. By encasing the roller bearings within the rail structures, I guard against the accumulation of foreign matter in the bearings and effectually protect the oil supply against water or steam, which in some instances is applied, to conveyors, under high pressure, for cleansing purposes. The bearings thus protected are free from rust and consequent rapid deterioration common in conveyors of this type.

Changes in the specific form of my invention, as herein disclosed, may be made within the scope of what is claimed without departing from the spirit of my invention.

Having described my invention, what I claim as new and desire to secure by Letters Patent is:

1. The combination with rollers having axles at their ends equipped with roller bearings, of a pair of rails, each rail including a supporting section and a guard section, the former having seats therein to receive the outer races of said bearings and adapted also to contain a lubricating medium for the bearings, the guard section being designed to cover said bearings, and means for detachably securing together the supporting and guard sections of each rail to form rigid unitary structures.

2. The combination with rollers having axles at their ends equipped with roller bearings, of a pair of rails, each rail including a supporting section and a guard section, the former having seats therein to receive the bearings and lubricating medium therefor, said sections being also formed with traps communicating with each seat at opposite sides thereof to catch the lubricating medium from said seats upon tilting movements of the conveyor, the guard section being designed to cover said bearings, and means for detachably securing together the supporting and guard sections of each rail to form rigid unitary structures.

3. The combination with rollers having axles at their ends, of a pair of supporting rails for said rollers, each rail including a pair of angle irons arranged edge to edge in reversed relation to form a tubular structure and a filler-bar fitting closely within said structure and adapted to support the axles of said rollers, and tie bolts passing through the angle irons and filler-bar of each rail to form a rigid unitary structure.

4. The combination with rollers having axles at their ends, of a pair of supporting rails for said rollers, each rail including a pair of angle irons arranged edge to edge in reversed relation to form a tubular structure and a filler-bar fitted closely within said structure and adapted to support the axles of said rollers, and means for joining the angle irons of each rail to form a rigid unitary structure.

5. The combination with rollers having axles at their ends, of supporting rails for said rollers, each rail including detachably united sections, one forming a bearing for the roller journals and the other forming a guard to cover and protect the same, said sections serving also to re-enforce each other and form a rigid unitary rail.

6. The combination with rollers having axles at their ends, of a pair of supporting rails for said rollers, each rail including a pair of angle irons arranged edge to edge in reversed relation to form a tubular structure and a filler-bar fitting closely within said structure and supplied with spacing lugs to form catch chambers, said filler bar being provided with seats between said lugs, bearings in said seats for the ends of said axles and means for securing the angle irons and filler bars together to form a rigid unitary structure.

In testimony whereof, I have signed my name to this specification.

WALTER HERMAN RIEDEL.